United States Patent [19]
Doornink et al.

[11] Patent Number: 5,084,830
[45] Date of Patent: Jan. 28, 1992

[54] METHOD AND APPARATUS FOR HIDDEN SURFACE REMOVAL

[75] Inventors: Douglas J. Doornink; John C. Dalrymple, both of Portland, Oreg.

[73] Assignee: Tektronix, Inc., Beaverton, Oreg.

[21] Appl. No.: 113,045

[22] Filed: Oct. 26, 1987

[51] Int. Cl.$^5$ .............................................. G06F 3/14
[52] U.S. Cl. ............................. 395/164; 364/521; 340/729; 340/750; 395/143
[58] Field of Search .................. 364/521, 522, 518; 340/724, 747, 750, 799, 729; 382/41

[56] References Cited

U.S. PATENT DOCUMENTS

| | | | |
|---|---|---|---|
| 4,609,917 | 9/1986 | Shen | 340/729 |
| 4,609,993 | 9/1986 | Shimizu | 364/522 |
| 4,625,289 | 11/1986 | Rockwood | 364/522 |
| 4,679,041 | 7/1987 | Fetter et al. | 340/747 |
| 4,684,990 | 8/1987 | Oxley | 358/183 |
| 4,697,178 | 9/1987 | Heckel | 340/729 |
| 4,719,585 | 1/1988 | Cline et al. | 364/518 |
| 4,730,261 | 3/1988 | Smith | 364/521 |

OTHER PUBLICATIONS

Sutherland et al., "A Characterization of Ten Hidden-Surface Algorithms", Spring COMPCON 79, pp. 293-347.

Primary Examiner—Gary V. Harkcom
Assistant Examiner—Phu K. Nguyen
Attorney, Agent, or Firm—John Smith-Hill; Francis I. Gray

[57] ABSTRACT

A memory device having a plurality of addressable memory locations, each of which can be defined uniquely by an address word having an X component and a Y component, which memory locations correspond respectively to grid points in a rectangular array at a pitch dX in the X direction and a pitch dY in the Y direction, is loaded with data values Q. In a first operating cycle, a first address word defining a memory location corresponding to a first grid point is generated. In a second cycle, a first value of Q as a function of X and Y is computed, and concurrently a second address word defining a memory location corresponding to a second grid point is generated. In a third cycle, the first value of Q is compared with a previous value of Q for the first grid point, and concurrently a third address word defining a memory location corresponding to a third grid point is generated and a second value of Q is computed. In a fourth cycle, the first value of Q is loaded into the memory location corresponding to the first grid point if that first value of Q bears a predetermined relationship to the previous value of Q.

14 Claims, 3 Drawing Sheets

METHOD AND APPARATUS FOR HIDDEN SURFACE REMOVAL

BACKGROUND OF THE INVENTION

This invention relates to a method and apparatus for hidden surface removal.

In a computer graphics system, an image is displayed on the screen of a cathode-ray-tube (CRT) or other display device. Generally, the electron beam of the CRT is deflected under control of a digital signal having an X (horizontal) component and a Y (vertical) component, so that pixels on a rectangular array of grid points are addressed row-by-row in accordance with a raster pattern. Data representing the image is generated in a host computer and is down-loaded from the host computer to a frame buffer. The frame buffer has memory locations which correspond on a one-to-one basis with the grid points of the CRT display. In the following description, it will be assumed for the sake of clarity that the memory locations of the frame buffer are physically arranged in a rectangular array which corresponds to the array of grid points of the display.

The digital signal that is used to control deflection of the CRT's electron beam is also used to control addressing of the frame buffer, and the color with which the pixel at a grid point is displayed depends on the contents of the corresponding memory location. The frame buffer thus contains a virtual image of the display that is provided by the CRT. The data provided to the frame buffer by the host computer may represent an image composed of colored areas. The process of loading data values into the frame buffer memory to represent a colored area is called tiling. In the following description, references are made in connection with a tiling operation to the tiling of specified grid points and to the tiling of triangles. However, this is intended merely as an abbreviated way of referring to the tiling of the memory locations corresponding to the specified grid points and to the tiling of the memory locations corresponding to the grid points that lie within the triangles.

A triangular surface in three-dimensional space can be defined by a plane equation $Z = AX + BY + C$ and the coordinates of its three vertices. A computer graphics system may be used to depict a three-dimensional object having triangular surfaces by projection of those surfaces into a two-dimensional display plane ($Z=0$). Each triangular surface forms a triangle or a line when projected into the display plane. The case in which the projection is a line will not be considered further herein. Information defining the triangular surfaces in three-dimensional space is specified to a host computer, which utilizes that information to generate information defining the corresponding display plane triangles. This information is made available by the host computer to a rendering engine, which is used to load shading intensity values into the frame buffer. Generally, the triangular surfaces are treated sequentially by the host computer. In order to provide an accurate depiction, it is necessary to take account of the fact that when a three-dimensional object is examined, surfaces of the object that are on the far side of the object from the viewer cannot be seen, and therefore data representing these surfaces should not be loaded into the frame buffer. In a graphics system, this is accomplished by hidden surface removal. Before loading an intensity value I for a point of a triangular surface (corresponding to a grid point in the display plane) into the frame buffer, a Z value (Znew) representing the distance of that point from the display plane is calculated and is compared with a Z value (Zold) already present in a separate buffer (the Z buffer) for that point. The Z buffer is initially loaded with a Z value for each grid point that represents the greatest distance from the display plane within the range of distance values that can be stored in the Z buffer. If Znew represents a smaller distance than Zold, the intensity value is written into the corresponding memory location of the frame buffer, overwriting any intensity value previously stored at that location, and Znew is written into the corresponding location of the Z buffer, overwriting Zold. Otherwise, the value Zold remains in the Z buffer and the intensity value stored in the frame buffer is unchanged. Hidden surface removal is discussed in Newman and Sproull, "Principles of Interactive Computer Graphics" (McGraw-Hill Book Company, 1979), Second Edition, 369.

The rendering engine of a previously known three-dimensional graphics system receives data representing the coordinates (X, Y) of each vertex of a triangle obtained by projecting a triangular surface into the $Z=0$ plane and also receives functions that relate Z and I to values of X and Y. The rendering engine generates coordinates of the grid points inside the triangle and values of Z and I for each grid point. The rendering engine communicates with both the frame buffer and the Z buffer. In a first operating cycle, the rendering engine computes the coordinates of a grid point, and on a second operating cycle it computes Znew for that grid point. On the third cycle, Zold for the corresponding memory location is read from the Z buffer, and on the fourth cycle Zold is compared with Znew. If Znew represents a smaller distance than Zold, Znew is written into the Z buffer in the fifth cycle. In the sixth cycle, the value of I is computed for the same grid point, and in the seventh cycle the computed value I is written into the corresponding memory location of the frame buffer. If Znew represents a greater distance than Zold, the rendering engine idles for the fifth, sixth and seventh cycles. Accordingly, seven operating cycles must be performed for each grid point.

U.S. Pat. No. 4,475,104 issued Oct. 2, 1984 discloses a three-dimensional graphics system in which a display processor is used to carry out hidden surface removal.

SUMMARY OF THE INVENTION

A preferred embodiment of the present invention in its first aspect is a method of loading a memory device having a plurality of addressable memory locations, each of which can be defined uniquely by an address word having an X component and a Y component. The memory locations correspond respectively to grid points in a rectangular array at a pitch dX in the X direction and a pitch dY in the Y direction. The method comprises generating a first address word defining a memory location corresponding to a first grid point. A first value of Z, which is a function of X and Y, is computed and concurrently a second address word, defining a memory location corresponding to a second grid point, is generated. The first value of Z is compared with a previous value of Z for the first grid point, and concurrently a third address word, defining a memory location corresponding to a third grid point, is generated and a second value of Z is computed. If the first value of Z bears a predetermined relationship to the previous value of Z, a first value of I, which is a function of X and Y, is loaded into the memory location corresponding to the first grid point.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
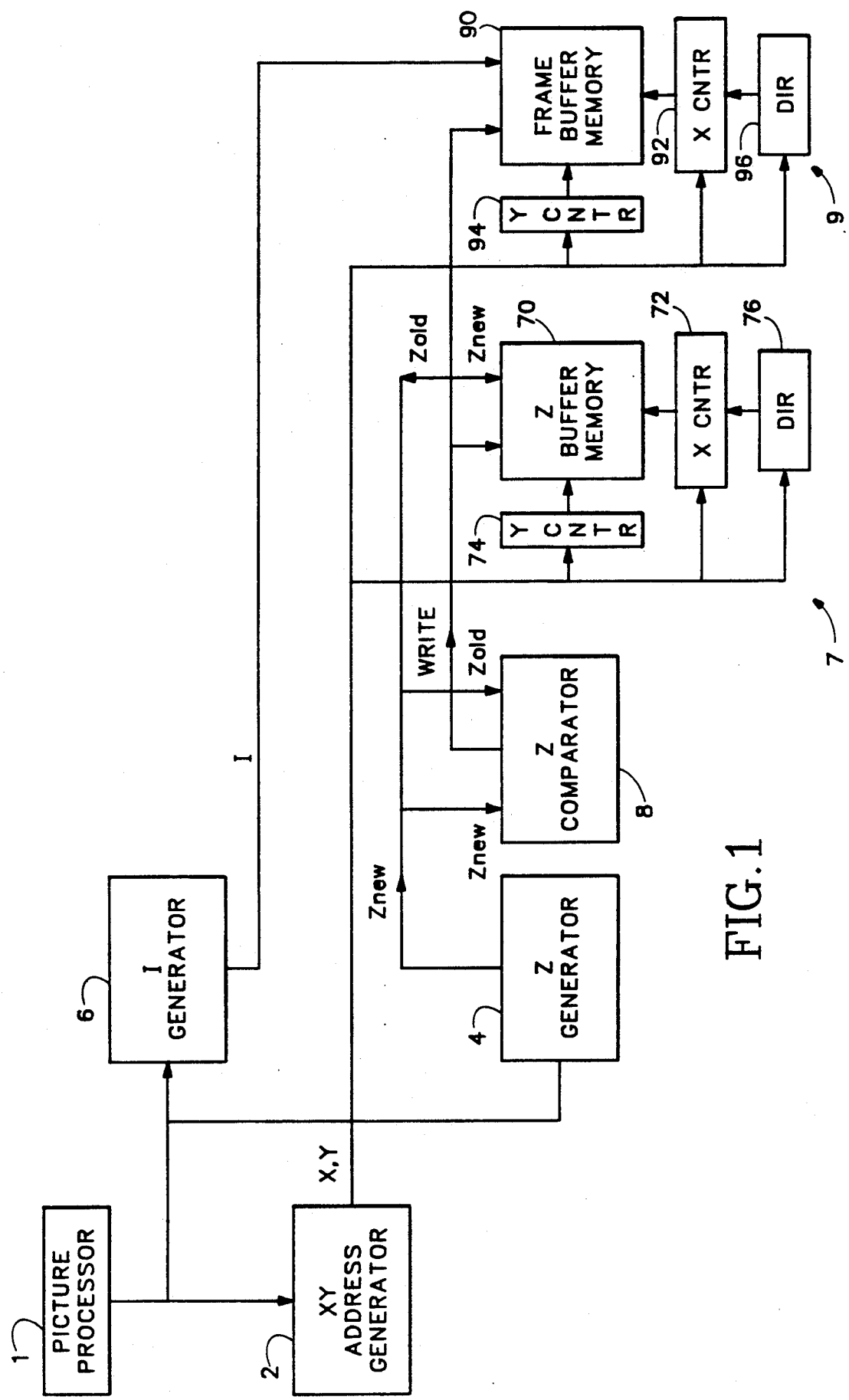
FIG. 1 is a block diagram of a computer graphics system.
Figure 2:
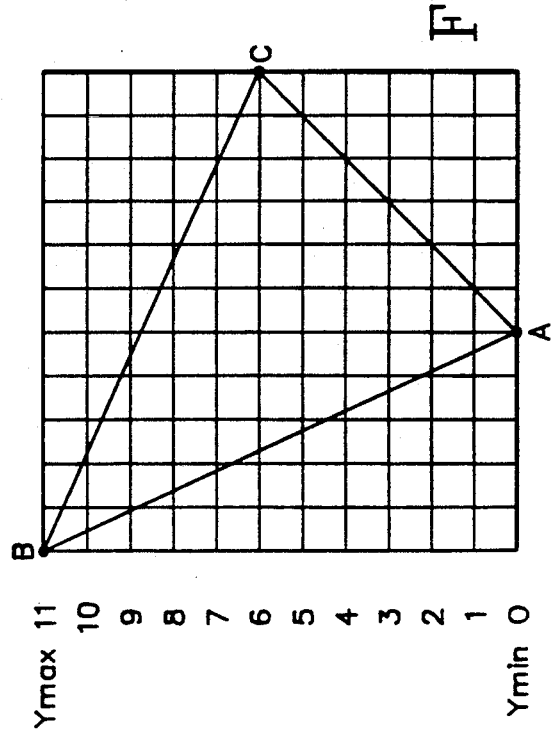
FIG. 2 illustrates a rectangular array of grid points and a triangle having its vertices at grid points.

The computer graphics system illustrated in FIG. 1 comprises a processor 1 which receives a display list and generates information representing triangles and applies information defining these triangles sequentially to an XY address generator 2. The XY address generator 2 enables tiling of a triangle whose vertices lie at grid points of a rectangular grid, the triangle having two opposite sidings which extend between a minimum ordinate value $Y_{min}$ and a maximum ordinate value $Y_{max}$. Such a triangle, having sidings AB and ACB, is shown in FIG. 2. In the case of the triangle shown in FIG. 2, the value of $Y_{min}$ is indicated arbitrarily as being zero.

The grid points inside the triangle are to be tiled row by row, from below upwards. A row may be tiled either from left to right or from right to left. One of the sidings is selected as the "major" siding. During tiling of the triangle, tiling proceeds from the major siding to the opposite, "minor" siding. Generally, the major siding is selected to be the siding that is composed of fewer edges. In the case of FIG. 2, therefore, the siding AB is selected as the major siding. If both sidings have the same number of edges, i.e., if one edge of the triangle is horizontal, so that it extends along the grid row $Y_{max}$ or $Y_{min}$, the major siding is selected as the left siding.

The graphics system further comprises a Z generator 4, an I generator 6, a Z buffer 7, a Z comparator 8 and a frame buffer 9. The Z buffer 7 and the frame buffer 9 each comprise a memory 70, 90 having a rectangular array of memory locations, an X address counter 72, 92, a Y address counter 74, 94 and a one bit storage element 76, 96. The memory 70 comprises five banks of memories, not separately shown, and accordingly each memory cycle, during which a read operation and a conditional write operation are performed, corresponds in duration to five clock cycles. The blocks 2, 4, 6, 7, 8 and 9 communicate over a local display bus. To facilitate illustration of the graphics system in FIG. 2, the local display bus is not shown; rather, separate connections between the various blocks are shown in FIG. 2.

The local display bus is a 32 bit multiplexed address-/data bus. During an address cycle, the top four bits (31-28) specify the block that is to receive the next data cycle, the next bit (27) is a hesitate bit, bits 26-24 specify the octant in which the current vector lies, and thus indicate coarsely the direction of the current vector, bits 23-12 are a Y address, and bits 11-0 are an X address. In a tiling operation, only two directions are possible and bits 25 and 24 are not changed when the direction of tiling changes. Therefore, bit 26 determines whether tiling takes place from right to left (bit 26 set) or from left to right (bit 26 not set). Whether the information on the bus is interpreted as an address or as data depends on the state of control lines.

For each grid row of a triangle to be tiled, the XY address generator generates address words representing the coordinates (X, Y) of one grid point on that row of the triangle. These addresses are applied to the Z buffer 7 and the frame buffer 9 and are stored in the X address counters 72, 92 and the Y address counters 74, 94. The storage elements 76, 96 receive the direction bit (bit 26).

In order to tile a triangle, the XY address generator 2 and the Z and I generators 4 and 6 are first placed in an initialization state and are then placed in an operating state, in which operation is under control of a state machine 12 (shown in FIG. 3 but not in FIG. 1), which steps sequentially through predetermined states in successive clock cycles defined by a master clock 14.

Figure 3:
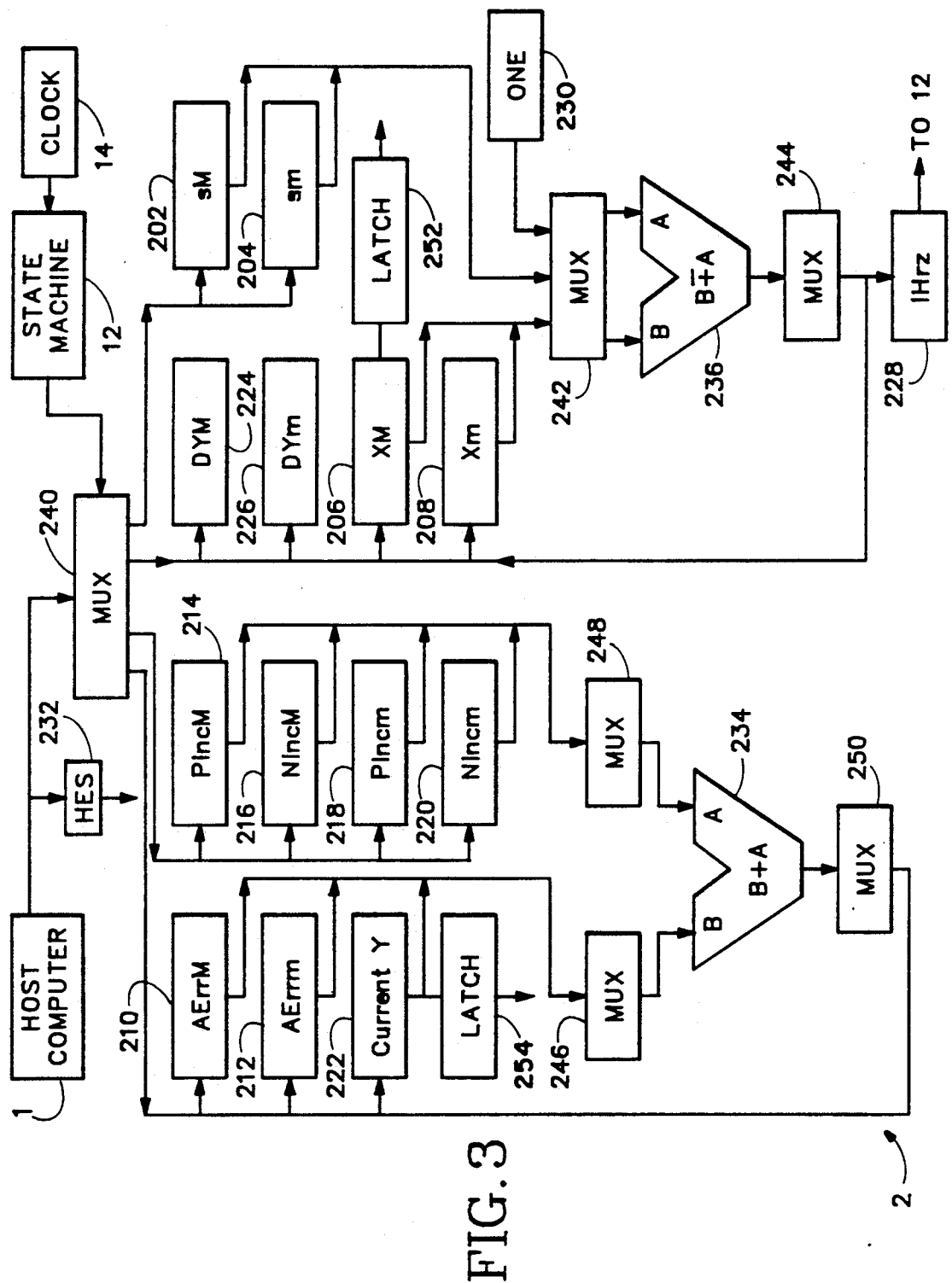
FIG. 3 is a more detailed block diagram of one part of the computer graphics system shown in FIG. 1.

The XY address generator is illustrated in greater detail in FIG. 3. The XY address generator 2 comprises eleven registers 202-222, three counters 224-228, a constant value (one) 230, a one bit storage element 232, an adder 234 and a subtractor 236. The counters 224-228 and the registers 202-222 are initialized with values applied by the picture processor 1 through a multiplexer 240.

In order to initialize the XY address generator, the picture processor 1 calculates the coordinates of the vertices A, B and C of the triangle and determines which vertices have the minimum and maximum Y coordinate values $Y_{min}$ and $Y_{max}$, and which siding of the triangle is the major siding. The picture processor also calculates the cross product of the two edges that extend upwards from the grid row $Y_{min}$ and if this cross product indicates that the major siding is to the right of the minor siding the picture processor places a logical 1 in the storage element 232.

The X coordinates of the points A and B are subtracted to yield a value DXM and the Y coordinates of the points A and B are subtracted to yield a value DYM. Similarly, from the X and Y coordinates of the points A and C, values of DXm and DYm are calculated. The picture processor loads the values DYM and DYm into the counters 224 and 226. The values of (DX/DY) for the major and minor edges AB and AC are calculated and the values of floor (DX/DY) for the major and minor edges are calculated. (The floor operator applied to a number returns the greatest integer not exceeding the number. Thus, floor 1.2=1, floor 2.0=2 and floor −1.2=−2.) The resulting values sM and sm are loaded into the registers 202 and 204. The registers 206 and 208 receive the X coordinates $XM_0$ and $Xm_0$ of the grid points at which the major and minor edges intersect the lowest grid row $Y_{min}$. In the case of the triangle shown in FIG. 2, the values for $XM_0$ and $Xm_0$ are each the X coordinate of the point A. However, it is not necessary that the major and minor sidings meet at a vertex at either the bottom grid row or the top grid row. The registers 202, 204, 206 and 208 and the constant 230 are connected through a multiplexer 242 to the subtractor 236. The output of the subtractor 236 is applied to a multiplexer 244 having outputs connected to the registers 206 and 208 and to the counter 228.

The values of s, DX and DY for the major and minor edges AB and AC are further used by the picture processor to calculate values of $AErr_0$, PInc and NInc, such that $$PInc = AErr_0 = DX - sDY - DY$$
$$NInc = DX - sDY$$

These values are loaded into the registers 210-220. The register 222 is loaded with $Y_{min}$ (zero in the case of FIG. 2). The registers 210, 212 and 222 are connected through a multiplexer 246 to one input of the adder 234, while the registers 214-220 are connected through a multiplexer 248 to the second input of the adder 234. The output of the adder 234 is applied to a multiplexer 250 having outputs connected to the registers 210, 212 and 222.

When the XY address generator has been initialized in this manner, the state machine places the XY address generator in its operating state in which it executes alternately a calculation routine and a count-down routine. At the start of the calculation routine, the state machine examines the sign bits for $AErrM_i$ and $AErrm_i$, where i is an integer greater than or equal to zero and represents the number of the grid row. During a first clock cycle of the calculation routine, the subtractor 236 adds sM or sM+1, depending on whether $AErrM_i<0$ or $AErrM_i>=0$, to the contents of the register 206, providing the value of $XM_{i+1}$, where $XM_{i+1}$ is the floor of the exact intersection of the major edge with the (i+1)th grid row. Concurrently, the adder 234 adds PIncM or NIncM, depending on whether $AErrM_i<0$ or $AErrM_i>=0$, to the contents of the register 210, providing the value of $AErrM_{i+1}$. The count DYM in the counter 224 is decremented. During the second clock cycle, the corresponding operations are carried out using $AErrm_i$, sm, PIncm and NIncm, providing the values of $Xm_{i+1}$ and $AErrm_{i+1}$, and the count DYm is decremented. During the third clock cycle, the value stored in the register 222 is incremented by the adder 234, returning the value i+1, and concurrently $XM_{i+1}$ is subtracted from $Xm_{i+1}$ by the subtractor 236 and the difference $Hrz_{i+1}$ is loaded into the counter 228. The value $Hrz_{i+1}$ is either the number of grid points between the major and minor edges on the (i+1)th row of grid points, or the complement of that number, depending on whether $XM_{i+1}$ is less than or greater than $Xm_{i+1}$. The values stored in the registers 206 and 222 are loaded into latches 252 and 254. The calculation routine is then complete, and the XY address generator 2 issues an address cycle to the Z buffer 7 and the frame buffer 9. In this address cycle, the values in the latches 252 and 254, which represent the coordinates ($XM_{i+1}$, i+1) of the floor of the exact intersection of the siding AB with the (i+1)th grid row, are applied to the local display bus as bits 0-11 and 12-23, the contents of the storage element 232 determine the state of bit 27 (the hesitate bit), and the state of the sign bit of the counter 228 determines the state of bit 26 (the direction bit). The state machine then causes the XY address generator to execute the count-down routine.

During the count-down routine, the count stored in the counter 228 is incremented or decremented on each clock cycle, and the XY address generator issues a data cycle each time the count is incremented or decremented. The data value placed on the local display bus during a data cycle is determined by the I generator.

The Z buffer 7 and the frame buffer 9 interpret an address cycle as indicating that tiling of a new row is about to start, and the values of $XM_{i+1}$ and i+1 are loaded into the X address counters 72, 92 and the Y address counters 74, 94. The value of bit 27, reflecting the state of the storage element 232, is applied to the state machine. Bit 26 is loaded into the storage elements 76, 96. If bit 26 is set it indicates that tiling is to take place from right to left ($XM_{i+1}$ greater than $Xm_{i+1}$) and the counters 72 and 92 are decremented on each data cycle; otherwise they are incremented on each data cycle. The value of the hesitate bit (bit 27) determines whether the counters 72 and 92 are incremented (decremented) before the data value received during the first data cycle is written into the memory 70 or 90. If bit 27 is not set, when a data cycle is received by the Z buffer 7 or the frame buffer 9 the value stored in the X address register 72 or 92 is incremented (decremented) and the data value received on that data cycle is written to the location designated by the new address; otherwise, when the first data cycle is received by the Z buffer or the frame buffer the value stored in the X address counter 72 or 92 remains unchanged and the data value is written to the location designated by the original address; and on the next and each succeeding data cycle the X address is incremented (decremented) and the data value is written to the location designated by the new address. In the case of the triangle shown in FIG. 2, bit 27 is not set, the number $Hrz_{i+1}$ is the number of grid points to be tiled in row i+1, and tiling is to take place from left to right. On each clock cycle, the count stored in the counter 228 is decremented.

If bit 27 had been set, indicating that $XM_{i+1}$ was to the right of $Xm_{i+1}$, the number $Hrz_{i+1}$ would be the two's complement of the number of grid points to be tiled and tiling would take place from right to left. On each clock cycle the count stored in the counter 228 is incremented.

When the counter 228 indicates a borrow when counting down or a carry out when counting up, the value stored in the counters 72 and 92 is equal to $Xm_{i+1}$. When the count stored in the counter 228 has reached zero counting down or −1 counting up, tiling of row (i+1) has been completed, and in each case, the grid points from one plus the floor of the exact intersection of the left siding with row (i+1) to the floor of the exact intersection of the right siding with that row, inclusive, have been tiled. The XY address generator then executes the calculation routine again, returning $XM_{i+2}$ and $Hrz_{i+2}$, and the value stored in the counter 222 is incremented.

The contents of the registers DYM and DYm are decremented on the first and second clock cycles respectively of each iteration of the calculation routine. When the contents of a register DYM or DYm reach 0, a vertex has been reached and new values of DY, PInc, NInc and $AErr_0$ are initialized for the next edge on the same siding. The XY address generator then executes another sequence of calculation routines and count-down routines in alternating sequence. Ultimately, using the values stored in the registers for row $Y_{max}-1$, the XY address generator generates values of XM and Hrz for the row $Y_{max}$. The value XM is the X coordinate of the vertex B, since the vertex B is at a grid point and the floor of an integer is the integer itself, and the value Hrz is zero because the two sidings meet at a vertex on row $Y_{max}$. If the triangle had had an edge on the row $Y_{max}$, the value of Hrz for that row would not have been zero.

It will be noted that no value of Hrz is calculated for i=0, and consequently the bottom grid row of the triangle is not tiled. However, the top row is tiled. Similarly, the grid point at the floor of the exact intersection of a grid row with the right siding (ACB in the case of FIG. 2) is tiled but that at the floor of the exact intersection of the grid row with the left siding is not tiled. Accordingly, when triangles abut, e.g. in a tessellation, a grid point at the boundary between two adjacent triangles is treated as being in one, and only one, triangle.

The XY address generator is described and claimed in co-pending U.S. patent application Ser. No. 07/113,031 filed Oct. 26, 1987, the disclosure of which is hereby incorporated by reference herein.

The Z generator 4 generates a value of Z (depth) for each pair of coordinates (X,Y) used to address the Z buffer memory and similarly the I generator 6 generates a value of I (shading intensity) for each pair of coordinates (X,Y). The functions relating Z and I to position (X,Y) are specified to the Z and I generators by the picture processor 1. The values of Z are applied to the Z buffer 7 and Z comparator 8.

The contents of each memory location of the Z buffer represent a distance from a display plane. Increasing values of Z represent increasing distance from the display plane (Z=0) in the direction away from the viewer of the display plane. The Z buffer 7 is initially loaded with a Z value for each grid point that represents the greatest distance from the display plane within the range of distance values that can be stored in the Z buffer. When a value of Z is made available by the Z generator for one of the grid points, the coordinates (X,Y) stored in the X and Y address registers 72 and 74 are used to read the existing value of Z (Zold) stored in the Z buffer for that grid point, and the Z comparator is used to compare Zold with the value of Z (Znew) provided by the Z generator. If Znew is less than or equal to Zold, Znew is written into the Z buffer in place of Zold and the value of I supplied by the I generator 6 is loaded into the corresponding memory location of the frame buffer 9.

Figure 4:
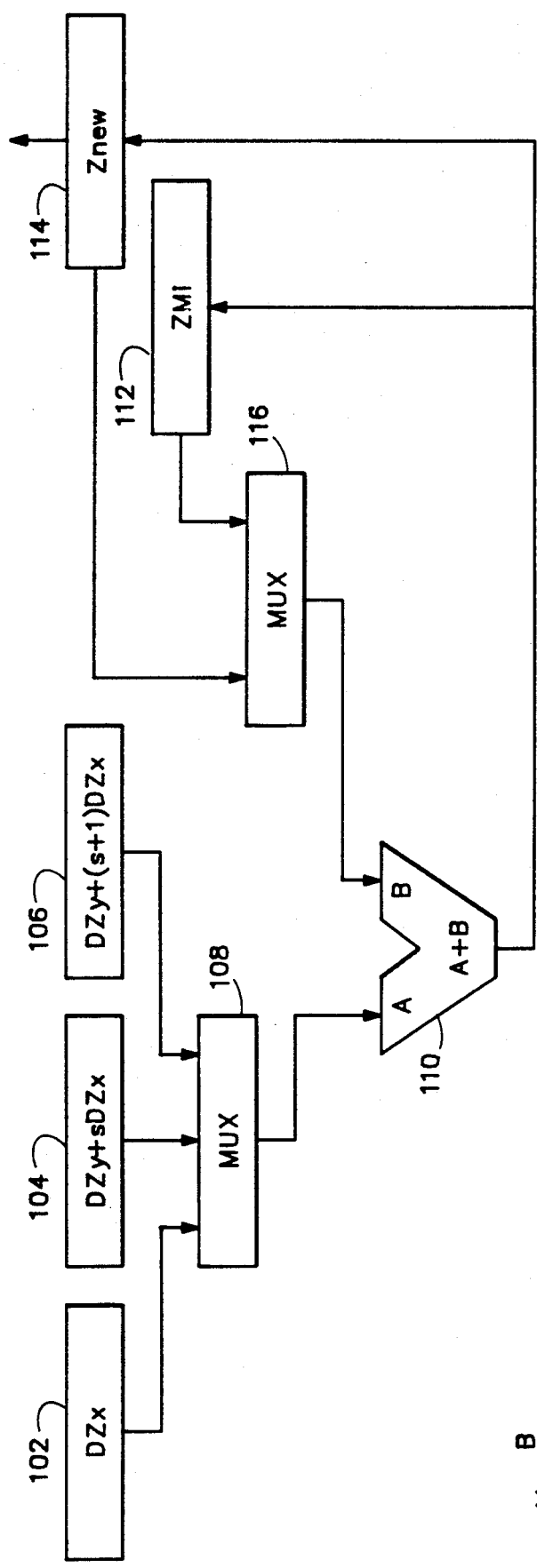
FIG. 4 is a more detailed block diagram of another part of the computer graphics system shown in FIG. 1.

The Z generator 4, which is shown in greater detail in FIG. 4, comprises three registers 102, 104 and 106. The three registers are connected to a multiplexer 108 whose output is connected to an adder 110. The adder has a second input which is provided by a register 112 or 114, depending on the setting of a second multiplexer 116. The output of the adder 110 is applied to the register 112 and the register 114, which is connected to the local display bus.

Since Znew for a triangular surface is a linear function of both X and Y, the difference DZx in Znew for two adjacent grid points on a grid row is independent of Y, and the difference DZy in Znew for grid points having the same value of X on adjacent grid point rows is independent of X.

The value of $XM_{i+1}$ generated by the XY address generator 2 for the (i+1)th row of grid points is given by $$XM_{i+1} = XM_i + s$$

or $$XM_{i+1} = XM_i + s + 1$$

depending on whether the error value $AErrM_i < 0$ or $AErrM_i > = 0$. Therefore, the difference between the value of Znew for the first grid point of the ith row and the value of Znew for the first grid point of the (i+1)th row is DZy+sDZx or DZy+(s+1)DZx.

In the initialization state, the processor loads the registers 102, 104 and 106 with the values DZx, DZy+sDZx and DZy+(s+1)DZx respectively. These values are calculated by the processor from the coordinates of the three vertices of the triangular surface that is to be depicted. The processor also calculates the value of Znew for the first grid point to the right of the lower vertex of the major siding of the triangle, i.e. the first grid point to the right of the point A in the case of FIG. 2. This value is obtained by adding DZx to the value of Znew for the point A. This value $ZM_0$ is loaded into the registers 112 and 114. The I generator 6 is identical to the Z generator 4 and operates in identical fashion, except that it computes values of I for each pair of coordinates (X,Y) based on values of DIx, DIy and the value of I for the vertex A. As each value of Znew is generated by the Z generator, a corresponding value of I is generated by the I generator.

After initialization, the Z and I generators enter the operating state. On the first clock cycle, during which the XY address generator issues an address cycle containing the address $(XM_1, Y_1)$, the multiplexer 108 of the Z generator selects the register 104 or 106, depending on whether $AErrM_0 < 0$ or $AErrM_0 > = 0$, and the multiplexer 116 selects the register 112. The adder 110 provides an output value which is the sum of the value provided by the selected register 104 or 106 and the value $ZM_0$ provided by the register 112 and represents Znew for the point $(XM_1+1, Y_1)$. This value is applied to both the register 112 as $ZM_1$ and the register 114. The XY address generator 2 issues a data cycle, and in response to this data cycle the Z generator outputs the value stored in the register 114 and the I generator outputs the corresponding value of I. On the second clock cycle, the multiplexers 108 and 116 select the registers 102 and 114 respectively, and the sum of the values stored in these registers is written back to the register 114. This value represents Znew for the point $(XM_1+2, Y_1)$. The XY address generator issues a second data cycle, and the values of Znew and I for the point $(XM_1+2, Y_1)$ are output by the Z and I generators. This continues until the Z and I generators receive a command from the Z buffer indicating that they should start generating values of Znew and I for the next grid row. On the next cycle after receiving such a command, the multiplexer 108 selects the register 104 or 106, depending on the sign of $AErrM_1$, and the multiplexer 116 selects the register 112. The output value provided by the adder 110 is applied to the register 112 as $ZM_2$ and to the register 114.

If the major siding of the triangle had been to the right of the minor siding, so that the first grid point to be tiled in row i is at $XM_i$, instead of $XM_i+1$, the value loaded into the register 112 by the processor during initialization is equal to the value of Z for the vertex A.

When the Z buffer and the frame buffer receive an address cycle from the XY address generator, the values $XM_{i+1}$ and $Y_{i+1}$ are loaded into the X and Y address counters of the Z buffer and frame buffer. The value stored in the X address counters 72 and 92 is incremented or decremented each time the Z buffer and frame buffer receive a data cycle, so that the memory locations corresponding to the grid points to be tiled are addressed consecutively. When the value stored in the counter 72 is $XM_{i+1}+j$, where j is an integer, the value of Zold stored in the memory 70 at the location $(XM_{i+1}+j, Y_{i+1})$ is read and is applied to the Z comparator during the first half of a memory cycle. The Z comparator compares the value Zold with the corresponding value of Znew, received from the Z generator, and generates a conditional write bit which is passed on by the Z comparator with the values Znew and I. If the conditional write bit is set, indicating that Znew is less than or equal to Zold, the value of Znew is written into the corresponding location of the Z buffer 7 during the second half of the memory cycle; otherwise, the value stored in the Z buffer is not changed. The value of I, along with the conditional write bit, is placed on the local display bus and is sent to the frame buffer where a similar conditional write operation is performed to the frame buffer memory 90.

When the Z buffer has received the last data cycle for a given grid row, it then receives the address cycle for the next grid row. The Z buffer responds to an address cycle by issuing a command to the Z and I generators to start generating values of Znew and I for the next grid row.

It will be seen that the functions of the Z and I generators, the Z buffer 7, the Z comparator 8 and the frame buffer 10 are pipelined so that each time the count $Hrz_{i+1}$ is decremented (if bit 26 is not set) or incremented (if bit 26 is set), a conditional write of intensity value into the frame buffer 10 is performed, except at the beginning of each count-down routine while the value of I for the first grid point of the row is propagating through the pipeline. Accordingly, the operation of loading the frame buffer is performed more quickly than using the previously known system.

It will be appreciated that the present invention is not restricted to the particular embodiment that has been described, and that variations may be made therein without departing from the scope of the invention as defined in the appended claims and equivalents thereof. For example, the value of Z might represent the complement of the distance between the display plane and a point of a triangular surface, in which case increasing values of Z represent decreasing distance from the display plane. The pipelined configuration of the XY address generator, the Z generator, the Z comparator, and the Z buffer and/or frame buffer is not limited to the XY address generator and the Z generator that have been described, and similarly the combination of the XY address generator and the Z generator is not limited to use in a pipelined configuration.

We claim:

1. A method of loading a memory device having a plurality of addressable memory locations, each of which can be defined uniquely by an address word having an X component and a Y component, which memory locations correspond respectively to grid points in a rectangular array at a pitch dX in the X direction and a pitch dY in the Y direction, comprising:
    (a) generating a first address word defining a memory location corresponding to a first grid point,
    (b) computing a value of a parameter Qc for the first grid point as a function of X and Y, and concurrently generating a second address word defining a memory location corresponding to a second grid point,
    (c) providing a value of a parameter Qp for the first grid point,
    (d) comparing the value of the parameter Qc for the first grid point with the value of the parameter Qp for the first grid point, and concurrently generating a third address word defining a memory location corresponding to a third grid point and computing a value of the parameter Qc for the second grid point, and
    if the value of the parameter Qc for the first grid point bears a predetermined relationship to the value of the parameter Qp for the first grid point,
    (e) loading the value of the parameter Qc for the first grid point into the memory location corresponding to the first grid point.

2. A method according to claim 1, comprising, before step (c), storing the value of the parameter Qp for the first grid point in memory, and step (c) comprises reading the value of the parameter Qp for the first grid point from memory.

3. A method according to claim 2, wherein the step of storing the value of the parameter Qp for the first grid point comprises loading the value of the parameter Qp for the first grid point into the memory location corresponding to the first grid point, and step (e) comprises loading the value of the parameter Qc for the first grid point into the memory location corresponding to the first grid point in place of the value of the parameter Qp for the first grid point.

4. A method according to claim 1, comprising, before step (c), storing values of the parameter Qp for the first and second grid points in memory, step (c) comprises reading the value of the parameter Qp for the first grid point from memory, and the method further comprises:
    (f) reading the value of the parameter Qp for the second grid point from memory,
    (g) comparing the value of the parameter Qc for the second grid point with the value of the parameter Qp for the second grid point, and concurrently generating a fourth address word defining a memory location corresponding to a fourth grid point and computing a value of the parameter Qc for the third grid point, and
    if the value of the parameter Qc for the second grid point bears a predetermined relationship to the value of the parameter Qp for the second grid point,
    (h) loading the value of the value of the parameter Qc for the second grid point into the memory location corresponding to the second grid point.

5. A method of loading a memory device having a plurality of addressable memory locations, each of which can be defined uniquely by an address word having an X component and a Y component, which locations correspond respectively to grid points in a rectangular array at a pitch dX in the X direction and a pitch dY in the Y direction, comprising:
    (a) generating a first address word defining a memory location corresponding to a first grid point,
    (b) computing a value of a parameter Qc for the first grid point as a function of X and Y, and concurrently generating a second address word defining a memory location corresponding to a second grid point,
    (c) providing a value of a parameter R for the first grid point,
    (d) providing a value of a parameter Qp for the first grid point,
    (e) comparing the value of the parameter Qc for the first grid point with the value of the parameter Qp for the first grid point, and concurrently generating a third address word defining a memory location corresponding to a third grid point and computing a value of the parameter Qc for the second grid point, and if the value of the parameter Qc for the first grid point bears a predetermined relationship to the value of the parameter Qp for the first grid point, (f) loading the value of the parameter R for the first grid point into the memory location corresponding to the first grid point.

6. A method according to claim 5, wherein step (c) comprises computing the value of R for the first grid point as a function of X and Y.

7. A method according to claim 6, wherein step (c) is performed concurrently with step (b).

8. A method according to claim 2, wherein step (f) further comprises loading the value of the parameter Qc for the first grid point into a second memory device.

9. A method according to claim 8, comprising, before step (d), storing a value of the parameter Qp for the first grid point in the second memory device, and step (d) comprises reading the value of the parameter Qp for the first grid point from the second memory device.

10. A method according to claim 8, wherein the second memory device has a plurality of memory locations that correspond respectively to the grid points in the rectangular array, and step (f) comprises loading the value of the parameter Qc for the first grid point into the second memory device at the location corresponding to the first grid point.

11. A method according to claim 10, wherein the step of storing the value of the parameter Qp for the first grid point comprises loading the value of the parameter Qp for the first grid point into the memory location of the second memory device corresponding to the first grid point, and step (f) comprises loading the value of the parameter Qc for the first grid point into the memory location of the second memory device corresponding to the first grid point in place of the value of the parameter Qp for the first grid point.

12. A method according to claim 5, comprising, before step (d), storing values of the parameter Qp for the first and second grid points in memory, step (d) comprises reading the value of the parameter Qp for the first grid point from memory, and the method further comprises:

(g) providing the value of the parameter R for the second grid point, (h) reading the value of the parameter Qp for the second grid point from memory, (i) comparing the value of the parameter Qc for the second grid point with the value of the parameter Qp for the second grid point, and concurrently generating a fourth address word defining a memory location corresponding to a fourth grid point and computing a value of the parameter Qc for the third grid point, and if the value of the parameter Qc for the second grid point bears a predetermined relationship to the value of the parameter Qp for the second grid point, (j) loading the value of the parameter R for the second grid point into the memory location corresponding to the second grid point.

13. Apparatus for generating values of a planar function Z for designated grid points in a rectangular array at a pitch dX in an X direction and a pitch dY in a Y direction, which is perpendicular to the X direction, the designated grid points lying substantially on a line from a point $(X_0, Y_0)$ to a point $(X_0+p*dX, Y_0+q*dY)$, where p and q are rational numbers, the apparatus comprising:

first storage means for receiving values of $X_0$ and s, where s is equal to the greatest integer not exceeding p/q, second storage means for receiving values of $AErr_0$, PInc, NInc and $Y_0$, where $$PInc = p - s*q - q$$
$$NInc = p - s*q$$
$$AErr_0 = PInc,$$

third storage means for storing values of $DZy+sDZx$, $DZy+(s+1)DZx$, and $Z_0$, where DZx is the change in Z for a change dX in X, DZy is the change in Z for a change dY in Y, and $Z_0$ is the value of Z at the point $(X_0+vdX, Y_0)$ where v is an integer, a subtractor coupled to the first storage means, a first adder coupled to the second storage means, a second adder coupled to the third storage means, control means coupled to the adders, the subtractor and the three storage means and operative, for each value of i in the range from 0 to r−1, where r is equal to the greatest integer not exceeding q, to set $Y_{i+1}$ equal to $Y_i+dY$ and, if $AErr_i> =0$, set $X_{i+1}$ equal to $X_i+(s+1)dX$, $Z_{i+1}$ equal to $Z_i+DZy+(s+1)DZx$ and $AErr_{i+1}$ equal to $Aerr_i+PInc$, and otherwise set $X_{i+1}$ equal to $X_i+sdX$, $Z_{i+1}$ equal to $Z_i+DZy+sDZx$ and $AErr_{i+1}$ equal to $AErr_i+NInc$, and output means for providing the values $X_{i+1}$, $Y_{i+1}$, and $Z_{i+1}$ from the second adder.

14. Apparatus according to claim 13, wherein the third storage means receive the value DZx, and for each value of i the control means further execute $J_i$ steps such that for each value of j in the range from 0 to $J_i$ $$X_{i+1,j}=X_{i+1,j-1}+k/(abs.k)$$

where k is a constant, abs.k is the absolute value of k and $X_{i+1,0}$ is equal to $X_{i+1}$, and in each step the control means execute $$Z_{i+1,j}=Z_{i+1,j-1}+DZx$$

where $Z_{i+1,0}$ is equal to $Z_{i+1}$.

* * * * *